Sept. 9, 1941.    K. C. MARKLEY    2,255,122
TESTING JACK FOR SOCKET TYPE METERS
Filed Aug. 15, 1940    7 Sheets-Sheet 1

Inventor
Kenneth C. Markley
By Shepherd & Campbell
Attorneys

Sept. 9, 1941. K. C. MARKLEY 2,255,122
TESTING JACK FOR SOCKET TYPE METERS
Filed Aug. 15, 1940 7 Sheets-Sheet 2

Inventor
Kenneth C. Markley
By Shepherd & Campbell
Attorneys

Sept. 9, 1941.  K. C. MARKLEY  2,255,122
TESTING JACK FOR SOCKET TYPE METERS
Filed Aug. 15, 1940  7 Sheets-Sheet 6

Inventor
Kenneth C. Markley

By Shepherd & Campbell
Attorneys

Sept. 9, 1941.   K. C. MARKLEY   2,255,122
TESTING JACK FOR SOCKET TYPE METERS
Filed Aug. 15, 1940   7 Sheets-Sheet 7

Patented Sept. 9, 1941

2,255,122

UNITED STATES PATENT OFFICE 2,255,122

TESTING JACK FOR SOCKET TYPE METERS

Kenneth C. Markley, Huntington Valley, Pa., assignor to The Eastern Specialty Company, Philadelphia, Pa., a corporation of Pennsylvania Application August 15, 1940, Serial No. 352,801

9 Claims. (Cl. 175—183)

Under modern and rapidly growing practice, watthour meters are provided with suitable plugs, so arranged that the meter may be bodily plugged into a suitable socketed receptacle and when so plugged in becomes automatically connected into the service line, ready to measure the current supplied to a given consumer. Meters of this type are known to the electrical industry as "socket type" meters.

It is common practice to test meters from time to time by connecting them to a suitable test instrument, this test instrument usually comprising a rotating watt-hour standard and a portable, so-called artificial load.

Where the person testing the meter has to employ a plurality of separate loose connections, in the form of jumper cables or the like, the time consumed in making the necessary connections has not only resulted in interrupting the service to the consumer for an undesirable length of time, but there has always been the danger of short-circuiting some of the lines. This is especially true when it is reflected that the connections to be made sometimes have to take care of a 2-wire meter and at other times have to take care of a 3-wire meter.

The present invention has for its object to provide a connection jack provided upon one of its faces with plugs adapted to be plugged into the meter socket in place of the meter and provided also with sockets for the reception of the plugs of the meter. This jack is provided with sockets for receiving the pins of a connection plug, this plug being permanently connected to a conventional testing instrument comprising artificial load and rotating watthour standard.

The connection plug, when connected with the jack in one position, makes the necessary connections for a 3-wire meter, and when connected in another position makes the necessary connections for a 2-wire meter, and the parts are so arranged that if the plugs which serve as the connections of the 2-wire meter be accidentally inserted into the position intended for the connections of a 3-wire meter, no damage will result.

Thus the mere act of removing the meter from its socketed receptacle, interposing the testing jack between meter and socket, and plugging the connection plug into place, properly connects the testing instrument to test either a 2-wire or 3-wire meter, and this result is accomplished with minimum interruption to the service and with assurance that the connections made will be the right connections. Provision is also made for testing 2-element network meters and for testing either 2-wire or 3-wire bottom-connected meters or for testing side-connected meters.

Further objects and advantages of the invention will be set forth in the detailed description which follows:

In the accompanying drawings:

Fig. 10$^a$ is a view like Fig. 10 of a modified form of plug, hereinafter described;

Fig. 12 is a wiring diagram of a test jack intended for the testing of 2-element network meters, employing an adapter shown in Figs. 13 to 16;

Figs. 13, 14, 15 and 16 are respectively front, side, rear and underside views of an adapter intended to be inserted between the plug of Fig. 10$^a$ and the test jack of Fig. 12 when testing 2-element network meters;

Like numerals designate corresponding parts throughout the several figures of the drawings.

Referring to the accompanying drawings, the jack consists of a main body 10, which is essentially a flat panel of electrical insulating material, preferably one of the varieties of Bakelite. Concealed within a shallow recess 10ª in the rear of body 10, and protected by back cover 11 are the necessary conductors 12 to 23 inclusive which make internal connections within the jack between contacts 28 to 35 inclusive and the receptacle contacts or sockets A (numbered 3, 5, 5', 2, 1, 4, 5ª, 2', 3') which receive the prongs 48 of the removable test cable plug 46.

The test jack is so designed that its rearwardly projecting prongs or terminals 28, 29, 30 and 31 will fit into the receiving terminals 24, 25, 26 and 27 of the stationary meter socket which is part of the permanent meter installation. (See Fig. 7.) The meter under test, after being first pulled out of said meter socket, is placed on the test jack so that the rearwardly projecting terminals 36, 37, 38 and 39 of the meter will fit into the receiving terminals 32, 33, 34 and 35 of the test jack.

When this has been accomplished, the meter under test will be connected only to the proper predetermined voltage and current connections as are provided for on the front face of the test jack and included in the sockets 3, 5, 5', 2, 1, 6, 2, 4, 5ª, 2', 3'. The rear terminals 28 and 31 of the test jack are connected by conductor 12, while the terminals 29 and 30 are connected by conductor 13, these connections providing a continuous by-passed path for electric service from "line" to the service to consumer, which path previously had been completed through the current coils of the meter.

Finally, the connections within the jack will, through plug 46, provide a source of voltage taken directly from conductors 12 and 13 from which to operate the elements of a conventional test mechanism 49 to which cable 45 leads and which test mechanism may comprise a rotating watthour standard 50ª and a portable, so-called artificial load 50ᵇ.

It will be an assistance toward a complete understanding of the accompanying wiring diagrams (Figs. 6 and 7) to remember that when the meter is in normal operation and connected to its load, terminals 36, 37, 38 and 39 of the meter fit directly into terminals 24, 25, 26 and 27 of the permanent meter socket. The electrical connections shown in the wiring diagrams are only those which exist when the test jack is in place and the meter placed thereon for testing.

Plug 46 consists of a body of insulating material made preferably of two equal halves 53 held together by screws 50. Flexible multi-conductor cable 45 is attached to said plug by means of clamp 51. The separate conductors within cable 45 terminate in the split pin terminals 48 (six such terminals being required in the present case) which match up with, and are intended to be inserted into, the nine previously described receptacle sockets A shown along the bottom edge of the test jack. Both pin terminals and receptacles are so spaced that it is impossible to insert plug 46 into the test jack except in one or the other of the two positions illustrated in Figs. 4 and 5, depending upon whether the meter under test is a 2-wire meter or a 3-wire meter.

The difference in the electrical connections in the two cases is completely taken care of by the two possible positions of the plug 46. In the case of a 2-wire meter, current must be sent through one meter current coil 41 with a nominal voltage of 120 volts across meter potential coil 40; in the case of a 3-wire meter, current must be sent through two meter current coils 41 and 41A in series with a nominal voltage of 240 volts across meter potential coil 40. In the latter case of testing a 3-wire meter, plug 46, in cooperation will contacts 42 on the meter body, and 43 on the test jack, automatically takes care of the proper routing of the testing current through the meter current elements and teh necessary isolation of one end of potential coil 40.

In case plug 46 is incorrectly placed in the "2-wire" position on the test jack, when a 3-wire meter is being tested, or vice versa, the worst that could possibly happen would be bucking of the two current coil elements, with non-rotation of the meter, or else blowing of the protective fuse 52 which is provided on the body of the jack. This would immediately give notice to the meter tester of the incorrect connection, and plug 46 would at once be inserted in the right sockets A. However, since the jack is plainly marked to show which sockets A are for a 2-wire meter and which are for a 3-wire meter, there would seem to be no reason why improper positioning of plug 46 should ever occur. Ample protection is therefore provided for the unlikely case of incorrect connections.

Figure 4:
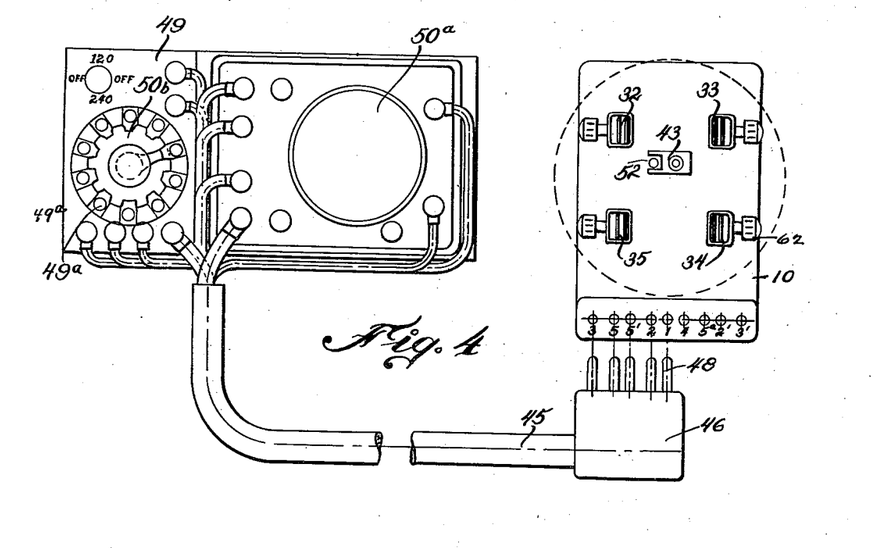
Fig. 4 is a face view of the test instrument, illustrating the connection plug in position to be plugged into the connections for a 2-wire meter.
Figure 5:
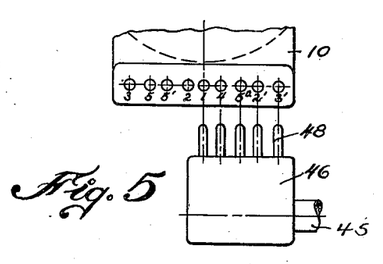
Fig. 5 is a fragmentary view of a portion of the jack, illustrating the connection plug in position to be plugged into the connections for a 3-wire meter.

Referring to Fig. 4, flexible cable 45 is carried from plug 46 to the testing device 49. A pendant switch 47 (see Fig. 12) may, if desired, be included in the potential circuit of rotating standard 50ª. This is a mere item of convenience permitting the control of the testing operation by the manipulation of this switch instead of by pulling out or replacing plugs 46, 46ª.

Wherever possible, the interconnecting current and potential wires between the test jack and the rotating standard and artificial load are kept under a common cover or sheath within cable 45 to eliminate the unsightly and hazardous collection of wires and jumpers which usually accompany a meter testing connection.

To further simplify connections and eliminate the chances of error, the various nominal current values obtainable from artificial load 50ᵇ are brought to a sufficiently large number of current terminals 49ª on the latter so that it is possible to permanently interconnect corresponding groups of low, intermediate and high current elements in the artificial load and the rotating standard.

Figure 11:
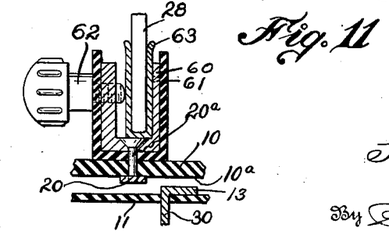
Fig. 11 is a fragmentary sectional view upon line 11—11 of Fig. 1.

The manner of connecting the connectors, such as 20, with the sockets, such as 32, is illustrated in Fig. 11, where a screw 20ª is illustrated as passing through the top of the jack and serving to tie the connector to a metallic cup 60. This cup is housed in a sheathing 61, of fiber or other insulating material, and it is threaded for the reception of a binding screw 62. This screw serves to compress a clip 63 upon the corresponding meter terminal, such as 36 for example.

Thus it will be seen that the device of the present invention comprises means whereby the act of inserting a plug into a jack accomplishes the simultaneous closing and opening, in any desired combination, of pre-determined groups of electrical contacts, in such manner that the meter under test is disconnected from the power line and metered load, said load is temporarily connected, without metering, to the power line, and the meter under test is connected to the testing instrument or instruments and to the source of testing current, all with a minimum of interruption to the service of the consumer.

The fact that individual conductors or jumpers for the several connections do not have to be handled separately results in the saving of a very considerable amount of time. The saving of this time is not only economical to the power company, but it avoids any considerable interruption of service to the consumer. Another most important consideration is that it avoids the possibility of such error in making connections upon the part of the meter tester as would result in short-circuiting and possibly burning up parts of the apparatus.

Since the device is intended to be used with meters whose mechanical and electrical constructions are completely standardized, it follows that a large number of meters, comprising a restricted number of types, may be tested by means of the device of this invention, thereby greatly reducing the number of testing parts and tools which the tester is obliged to carry with him in testing meters in the field.

It will be observed that the test jack and plug are so designed that there is a minimum number of electrical connections which might be accidentally touched during the course of a test, and that these are suitably protected against accidental contact therewith by the tester.

The parts so far described are those illustrated in Figs. 1 to 11. The subject matter of Figs. 12 to 19 has to do with the use of a removable and portable adapter which enables a meter tester to test 2-element watthour meters of the so-called socket type, when used in conjunction with a modified form of the connection jack hereinbefore described.

Figure 10:
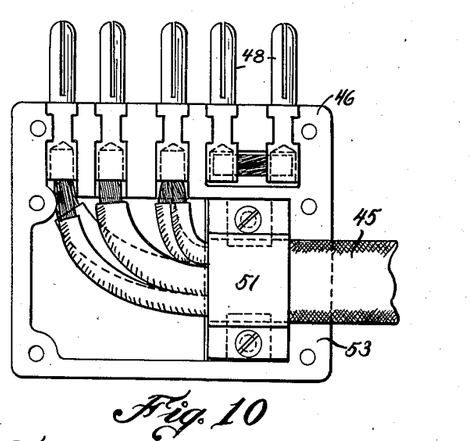
Fig. 10 is a view of said plug with one-half of the plug removed.
Figures 10A, 12, 13, 14, 15, 16:
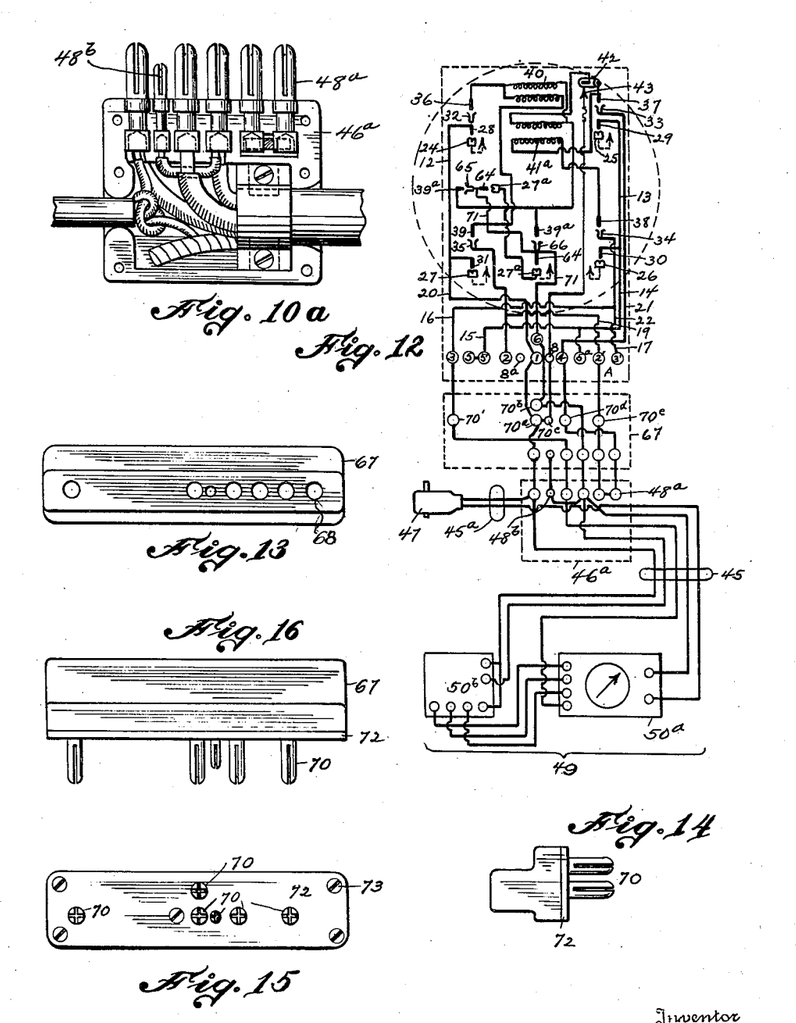

The type of meter to be tested with this structure is known as a 2-element socket type watthour meter having internal connections such as are illustrated in Fig. 12. An examination of Fig. 12 will show the difference between these 2-element meters and the 2-wire and 3-wire meters whose internal connections are shown respectively in Fig. 7 and Fig. 6.

Referring to Figs. 13 to 16 inclusive, the adapter consists of an insulated body 67, in the front face of which are located sockets or receptacles 68 which are electrically connected by means of suitable conventional internal connections to rearwardly projecting terminal posts 70 which are designed to fit into receptacles A (numbered 3, 1, 6, 8, 4, 5ᵃ, 2', and 3') in the main body of the test jack. The terminal posts 70 are held firmly in place by an insulating cover plate 72, which is attached by screws 73 to the adapter body 67.

Figure 1:
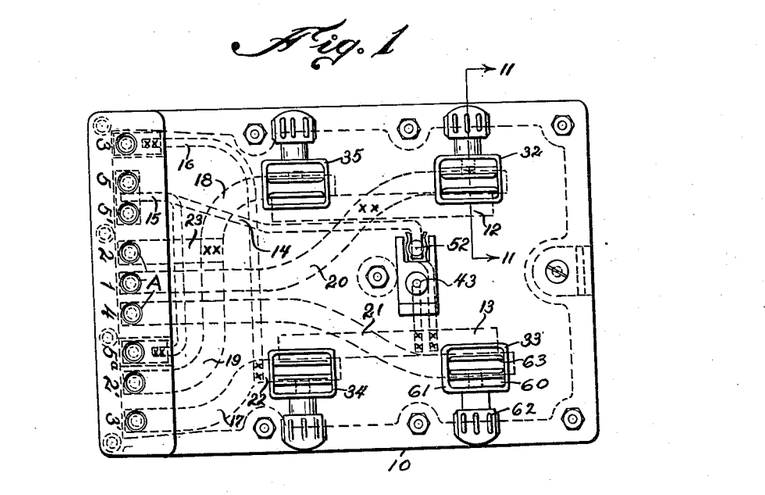
Figure 1 is a plan view of the test jack.
Figure 2:
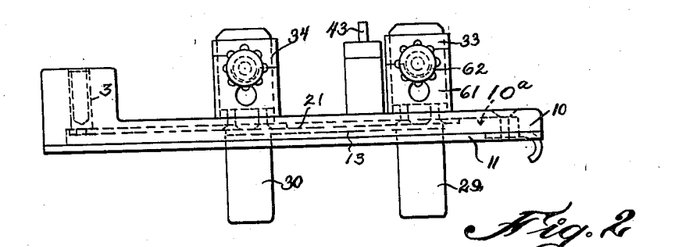
Fig. 2 is a side elevation thereof.
Figure 3:
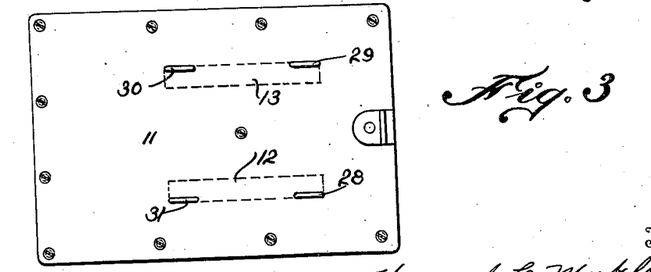
Fig. 3 is an underside plan view of the test jack.
Figure 17:
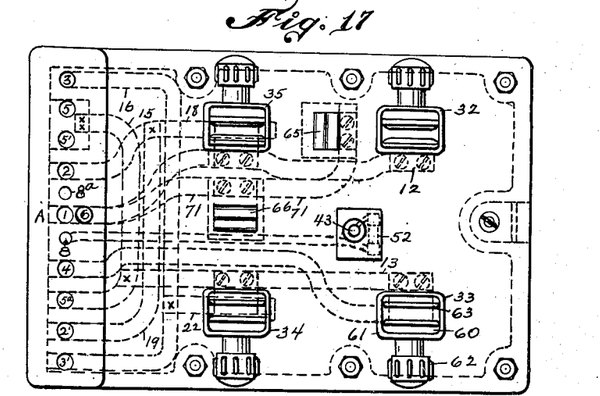
Figs. 17, 18 and 19 are respectively plan, side and bottom view of a slightly modified form of test jack for testing 2-element network meters.
Figure 18:
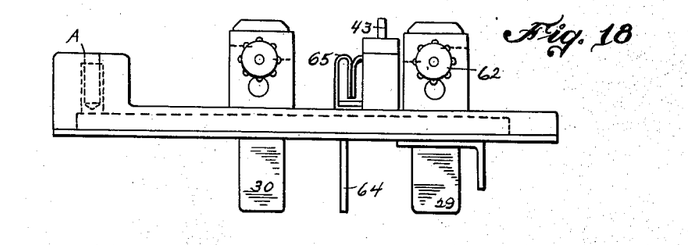
Figure 19:
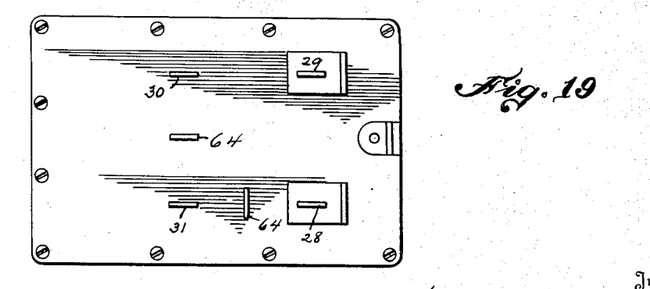

The test jack illustrated in Figs. 17, 18 and 19 is very similar to the test jack illustrated in Figs. 1, 2 and 3, the principal difference being that since the 2-element watthour meter is equipped with additional common, or neutral, contacts 39ᵃ (see Fig. 12), the test jack is provided with corresponding additional terminals 64 upon its front face, together with the additional receptacles 6 and 8 and busses or connections 71.

The receptacles 6, 8 are designed to receive the terminals 48ᵃ of plug 46ᵃ, the latter being very similar to the plug of Fig. 10 and comprising, in addition to Fig. 10, the small plug 48ᵇ. The test jack with the neutral connections of Figs. 12, 17, 18 and 19 may be used in place of the test jack of Figs. 1, 2, and 3 for the testing of 2-wire and 3-wire meters.

Figure 6:
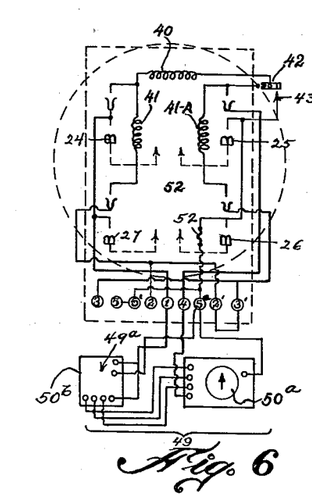
Fig. 6 is a wiring diagram illustrating the relationship of the connections of the device with a 3-wire meter.
Figure 7:
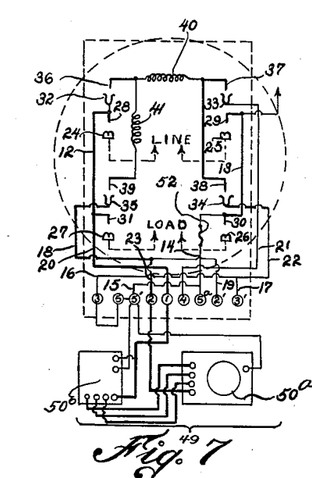
Fig. 7 is a diagrammatic view illustrating the relationship of the connections of the device with a 2-wire meter.

For manufacturing reasons, it is advisable, in some cases, to limit the electrical connections to those shown in Figs. 6 and 7 when only 2-wire and 3-wire meters are to be tested. Where the meters to be tested may be 2-wire, 3-wire or 2-element meters, then the test jack of Figs. 12, 17, 18 and 19 may be used to take care of all three cases.

As in the case of the test jack illustrated in Figs. 1 and 2, the spacing of the terminal posts 70 and receptacles 68 on the adapter 67 has been so arranged that the adapter may be inserted into the test jack in only one position, and plug 46ᵃ may be inserted into adapter 67 in only one position, so that the possibility of incorrect connections is automatically eliminated.

Figure 8:
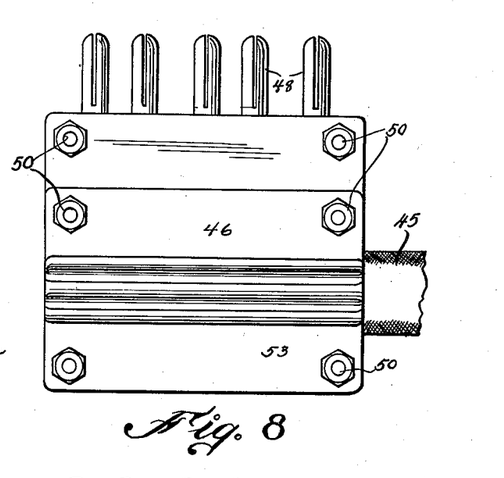
Fig. 8 is a side elevation of a connection plug hereinafter described.
Figure 9:
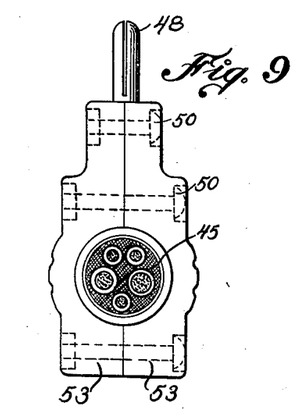
Fig. 9 is an end view of said plug.

The necessary combinations of equipment for testing may be summarized thus:

| Type of socket meter to be tested | Text jack | Plug | Adapter |
|---|---|---|---|
| 2-wire and/or 3-wire | Figs. 1, 2, 3 or Figs. 17, 1 8, 19. | Figs. 8, 9, 10 | None. |
| 2-element | Figs. 17, 18, 19. | Figs. 8, 9, 10 | Figs. 13, 14, 15, 16. |
| 2-wire and/or 3-wire and 2-element. | Figs. 17, 18, 19. | Figs. 8, 9, 10 | Figs. 13, 14, 15, 16. |

Referring now to Fig. 12, it will be seen that the left-hand terminal post 70' of plug 67 engages the socket 3 of the test jack; that the next post to the right, 70ᵃ, which aligns with the first post, connects with the socket 1 of the test jack; that the post 70ᵇ connects with the socket 6 of the test jack; that the small post 70ᶜ connects with the small socket 8 of the test jack; the contact post 70ᵈ connects with the socket 4 of the test jack, and the contact post 70ᵉ connects with the socket or receptacle 2' of the test jack.

The adapter shown in Figs. 22 to 25 is intended to render it possible to use the above described test jack for the testing of 2-wire, bottom connected meters and 3-wire, bottom connected meters. This removable and portable adapter enables a meter tester to use the testing combination of plug, source of testing current, and rotating standard hereinbefore described, and which was limited to the testing of so-called socket types of meters, in the testing of conventional bottom connected and side connected watthour meters of older make, in addition to the testing of the socket type meters. The overall usefulness of the testing device as a whole is thereby greatly increased. Such an arrangement is desirable, in view of the fact that for some time to come, many electric systems will have a mixed quantity of the newer type of socket meters, together with the existing conventional bottom connected and side connected meters.

Referring to Figs. 22 to 25, the adapter 74 consists of two suitably formed matching halves 75 and 75ᵃ of insulating material, preferably Bakelite or its equivalent, held together with screws 76. Flexible metal strip 77 is fastened with screws 78 to piece 75ᵃ, the free end of said strip being bent at right angles so as to act as a retaining piece which will hold adapter 74 and plug 46 operatively together as a unit.

Attached to the upper end of adapter 74 are three insulated flexible leads 79 terminating in clip terminals 80, the latter being protected by rubber sleeves 81. Leads 79 are held in place by means of cable clamps 82 which are fastened together by means of screws 83 and nuts 84, the projecting ends of said clamps being fitted into recesses within pieces 75 and 75ª which effectively retain said clamps and prevent leads 79 from being withdrawn from adapter 74.

Within the major cavity formed within adapter 74, the continuations 85 of leads 79 are soldered to receptacles 86, which are fitted into suitable semi-cylindrical cavities in pieces 75 and 75ª; when the latter are fastened together, receptacles 86 are effectively retained in place.

Receptacles 86, 86ª are designed to receive terminals 48ª and 48ᵇ of plug 46. Due to the fact that of the six terminals two are brought to a common electrical connection within the body of plug 46, and two others perform the function of an isolated jumper, there remain only three of said terminals 48ª which are electrically distinguishable and in direct electrical connection through cable 45 with load box 49 and rotating standard 50ª. Three live receptacles 86 only are therefore provided in the lower end of adapter 74, to receive three of the terminals 48. The remaining three terminals 48 are permitted to project into clearance holes or dummy receptacles 86ª within the body of adapter 74.

Figure 20:
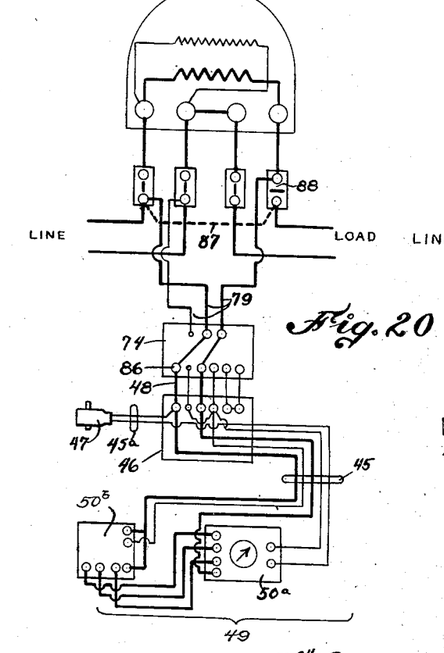
Fig. 20 is a wiring diagram showing the electrical connections for testing single phase, 2-wire, bottom connected meters.
Figure 21:
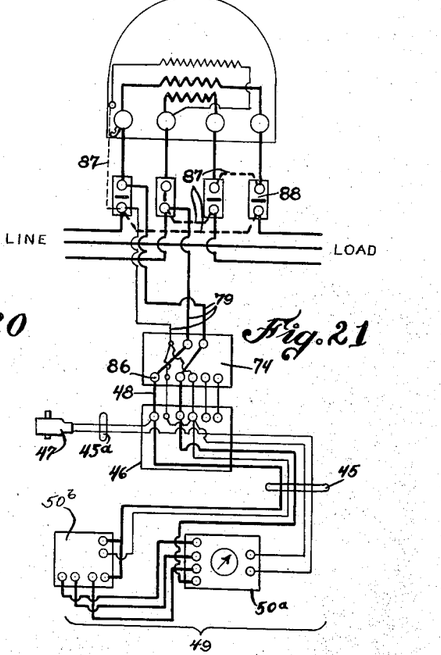
Fig. 21 is a wiring diagram showing electrical connections for testing single phase, 3-wire bottom connected meters.
Figures 22, 23, 26:
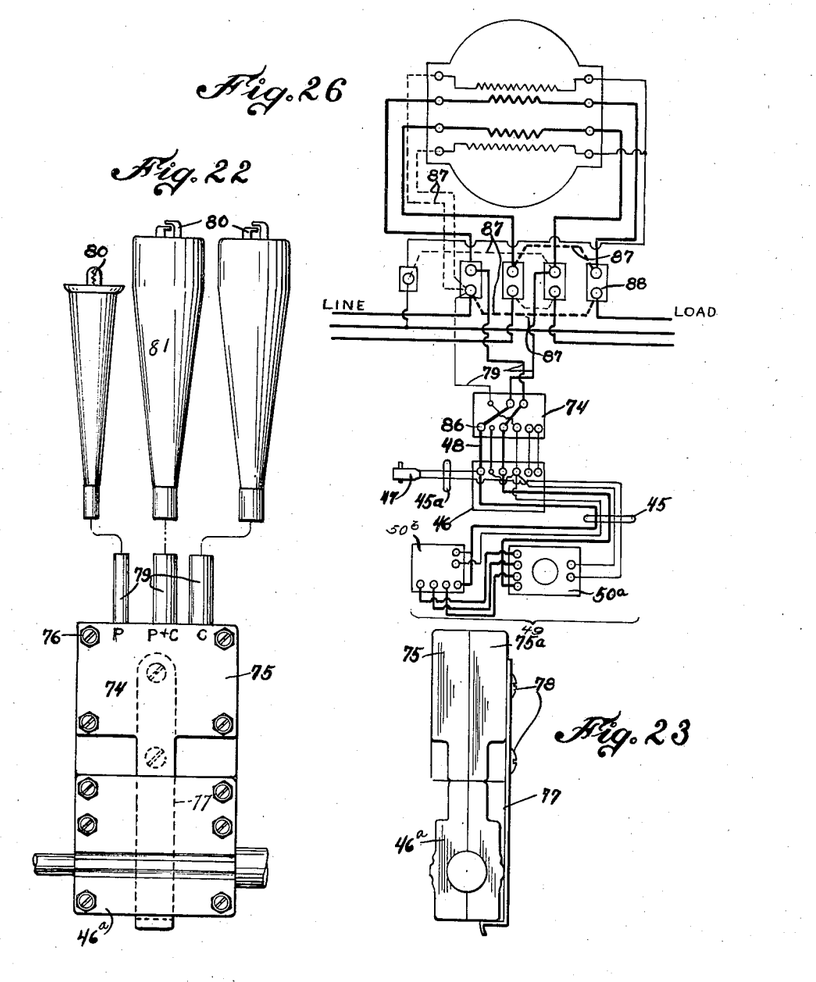
Figs. 22 and 23 are front and edge views respectively of an adapter for use in testing bottom connected meters.
Fig. 26 is a wiring diagram showing electrical connections for testing a 2-element, 3-wire, side connected meter.
Figure 24:
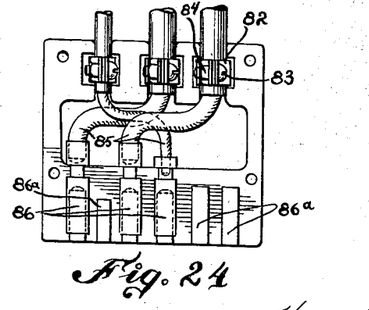
Fig. 24 is a face view of part of the adapter of Fig. 22, with one-half thereof removed.
Figure 25:
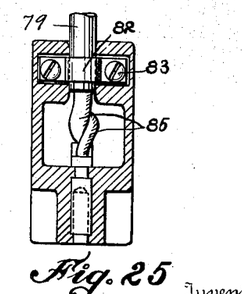
Fig. 25 is a vertical sectional view through the structure of Fig. 24.

Adapter 74 is provided with flexible leads 79 instead of rigidly fixed terminals, due to the fact that the terminal arrangements of existing types of bottom and side connected meters differ greatly in the location, number and spacing of the testing switches or testing blocks 88. (Figs. 20, 21 and 26.) In every case, as shown in said figures, additional short leads or jumpers 87 are required, said jumpers being part of the meter tester's regular equipment.

It will be appreciated by those skilled in the art that the connections shown in Figs. 20, 21 and 26 refer only to the simpler cases of testing. The number of terminals on a watthour meter of three elements, for example, may be as great as twelve. The necessary interconnections between meter elements will then be made by using a number of jumpers 87; but in ever case connection between the meter under test and the testing outfit can be completed by means of thre three flexible leads 79.

It is assumed that the meter tester is familiar with the basic circuit requirements for each type of meter. These requirements are fully and completely met by the connections of adapter 74. In order to facilitate the selection by the tester of the proper flexible leads, said leads are identified by means of letters engraved into the surface of adapter 74, as shown in Fig. 22.

While I have illustrated and described the device of the present invention as being used for the testing of watthour meters, it is to be understood that the invention is not limited, but that it includes within its purview the general testing of electrical instruments which are so constructed and mounted that they may be tested by removing them from their supporting connections, mounting them on a suitably constructed test jack, and then mounting both test jack and instrument upon the supporting socket which previously accommodated only the instrument being tested.

Consequently, it is to be understood that the invention includes within its purview whatever changes fairly come within either the terms or the spirit of the appended claims.

Having described my invention, what I claim is:

1. In a testing mechanism for socket type meters which comprise a receptacle having sockets into which meter-carried plugs are inserted, a testing jack adapted to be inserted between meter and socket, and provided with plugs to engage the meter socket and provided with sockets to receive the meter plugs, a testing instrument, a connection plug, permanent connections between said plug and the instrument, connections upon the jack adapted to be engaged by said plug to connect the test instrument to service and meter through said jack, and an adapter adapted to be inserted between said plug and jack, the connections being such that when the plug is plugged into the jack, connections are made to test 2-wire and 3-wire meters, while when the adapter is inserted between plug and jack, the connections are such as to test 2-element network meters.

2. In a device of the character described, the combination with a testing instrument comprising a watthour standard and an artificial load, of a plug having a plurality of receptacles in permanently wired relation to said standard and load, an adapter plug provided with terminals adapted to enter said receptacles, and flexible leads to said terminals, said terminals and leads being disposed in such relation that the adapter, in conjunction with said plug, provides the necessary connections for the testing of side connected and bottom connected watthour meters.

3. In a testing mechanism for socket type meters which comprise a receptacle having sockets into which meter-carried plugs are inserted; a testing jack adapted to be inserted between meter and socket and provided with plugs to engage the meter socket and provided with sockets to receive the meter plugs, a testing instrument, a connection plug, permanent connections between said plug and instrument whereby a defined relationship between the testing instrument and the connections of the plug is permanently maintained, connections upon the jack comprising the necessary connections for both two and three wire meters and including connections for the connections of the plug through which the testing instrument may be connected for testing either two or three wire meters.

4. In a testing mechanism for socket type meters which comprise a receptacle having sockets into which meter-carried plugs are inserted; a testing jack adapted to be inserted between meter and socket and provided with plugs to engage the meter socket and provided with sockets to receive the meter plugs, a testing instrument, a connection plug, permanent connections between said plug and instrument whereby a defined relationship between the testing instrument and the connections of the plug is permanently maintained, connections upon the jack comprising the necessary connections for both two and three wire meters and including connections for the connections of the plug through which the testing instrument may be connected for testing either two or three wire meters, and wherein the connections between the plug and jack are of such nature as to insure the making of the right connection through the act of positioning the plug.

5. A structure as recited in claim 4 wherein the connections within the body of the jack include connections to the service line of the consumer so that service is maintained throughout the testing operation.

6. In a testing mechanism for that type of electrical apparatus which comprises an instrument to be tested and a line-supplied socket into which said instrument is plugged during its normal operation; a jack comprising a body of insulating material, members carried by said body adapted to engage the line-supplied socket and the instrument to be tested, a testing instrument, a connection plug wired in permanently connected relation to the testing instrument, connecting elements upon the body to receive said plug, and connections within said body for connecting said elements, members and power line, the connections in the jack being in such number and disposition as to complete the proper circuits for a two wire meter when the said plug is engaged with one set of said connecting elements on the jack and to complete the proper circuits for a three wire meter when said plug is engaged with another set of said connecting elements of the jack.

7. In a testing mechanism for socket type meters which comprise a receptacle having sockets into which meter-carried plugs are inserted; a testing jack adapted to be inserted between meter and socket and provided with plugs to engage the meter socket and provided with sockets to receive the meter plugs, a testing instrument, a connection plug, permanent connections between said plug and instrument whereby a defined relationship between the testing instrument and the connections of the plug is permanently maintained, connections upon the jack comprising the necessary connections to connect a plurality of types of meters to the testing instrument, connections of the plug being such as to properly connect the connections of either type of meter but not connections of the meters of both types, with the testing instrument at a given time.

8. The combination with an electric watthour meter and a source of electrical supply, of a testing jack adapted to be inserted between the meter and the source of supply, said testing jack carrying a plurality of sets of connections to adapt it to test a plurality of types of meters, a testing instrument, a plug having connections for engagement with the jack in a way to accommodate the different types of meters to be tested and permanent connections between the plug and the testing instrument whereby the relationship between the testing instrument and the connections of the plug are permanently defined and maintained.

9. A structure as recited in claim 8 wherein the testing jack also carries connections for maintaining the consumer supply from service throughout the testing of all of the types of meters adapted to be handled by said jack.

KENNETH C. MARKLEY.